US011227066B2

(12) United States Patent
Hanafee (10) Patent No.: US 11,227,066 B2
(45) Date of Patent: Jan. 18, 2022

(54) SYSTEM AND METHOD FOR PERMISSION CONTROL SOCIAL NETWORKING

(71) Applicant: Paul Michael Hanafee, San Clemente, CA (US)

(72) Inventor: Paul Michael Hanafee, San Clemente, CA (US)

(*) Notice: Subject to any disclaimer, the term of this patent is extended or adjusted under 35 U.S.C. 154(b) by 324 days.

(21) Appl. No.: 16/565,215

(22) Filed: Sep. 9, 2019

(65) Prior Publication Data

US 2020/0082121 A1 Mar. 12, 2020

Related U.S. Application Data

(60) Provisional application No. 62/729,248, filed on Sep. 10, 2018.

(51) Int. Cl.
| | | |
|---|---|---|
| *G06F 21/62* | (2013.01) | |
| *G06F 21/60* | (2013.01) | |
| *H04L 9/08* | (2006.01) | |
| *G06Q 30/02* | (2012.01) | |
| *G06Q 50/00* | (2012.01) | |

(52) U.S. Cl.
CPC ........ *G06F 21/6254* (2013.01); *G06F 21/602* (2013.01); *H04L 9/0825* (2013.01); *G06Q 30/0277* (2013.01); *G06Q 50/01* (2013.01); *G06Q 2220/00* (2013.01)

(58) Field of Classification Search
CPC .. H04L 9/0825; G06Q 50/01; G06Q 30/0277; G06Q 2220/00; G06F 21/6254
USPC ....................................................... 713/171
See application file for complete search history.

(56) References Cited

U.S. PATENT DOCUMENTS

| | | | | |
|---|---|---|---|---|
| 2008/0015927 | A1* | 1/2008 | Ramirez | G06Q 30/02 |
| | | | | 705/7.29 |
| 2011/0137975 | A1* | 6/2011 | Das | G06Q 30/0269 |
| | | | | 709/203 |
| 2011/0173261 | A1* | 7/2011 | McCallie, Jr. | G16H 10/60 |
| | | | | 709/204 |

(Continued)

FOREIGN PATENT DOCUMENTS

| | | |
|---|---|---|
| WO | 2013070318 A1 | 5/2013 |
| WO | 2014186374 A1 | 11/2014 |

OTHER PUBLICATIONS

Xie, Qi, and Urs Hengartner. "Privacy-preserving matchmaking for mobile social networking secure against malicious users." 2011 Ninth Annual International Conference on Privacy, Security and Trust. IEEE, 2011 (Year: 2011).*

(Continued)

*Primary Examiner* — Syed A Zaidi
(74) *Attorney, Agent, or Firm* — Jeffri A. Kaminski; Venable LLP (57) ABSTRACT

Systems, methods, and computer-readable storage media for permission control in a social media platform. An exemplary system receives a social media profile of a user, encrypts/anonymizes the profile using asymmetrical encryption, then asks the user for permission before sharing any aspect of the user's profile with other entities. As the user engages with social media content on the social media platform, options are provided to the user which grant the user the opportunity to share specific portions of their profile with other entities, which sharing is done using a private key exclusive to the user.

20 Claims, 6 Drawing Sheets

(56) References Cited

U.S. PATENT DOCUMENTS

| | | | |
|---|---|---|---|
| 2013/0124628 A1* | 5/2013 | Weerasinghe | G06Q 30/0241 709/204 |
| 2013/0290716 A1* | 10/2013 | Gavrilov | H04L 63/0471 713/168 |
| 2017/0161264 A1 | 6/2017 | Zhao et al. | |

OTHER PUBLICATIONS

NPL Search Terms (Year: 2021).*
Extended European Search Report in corresponding European Application No. 19196158.0 dated Jan. 23, 2020 (7 pages).
European Office Action in corresponding European Application No. 19196158.0 dated May 4, 2021 (5 pages).
Anonymous; "Public-key cryptography—Wikipedia"; Jun. 28, 2018; XP055605036; Retrieved from the Internet: URL: https://web.archive.org/web/20180628231101/https://en.wikipedia.org/wiki/Public-key_cryptography; retrieved Jul. 12, 2019; 17 pages.

* cited by examiner

SYSTEM AND METHOD FOR PERMISSION CONTROL SOCIAL NETWORKING

PRIORITY

The present application claims priority to U.S. Provisional Patent Application No. 62/729,248, filed Sep. 10, 2018, the contents of which are incorporated herein in their entirety.

BACKGROUND

1. Technical Field

The present disclosure relates to social networking, and more specifically to how personal data is collected and shared within a social network.

2. Introduction

Social networks originated in the early 2000s, and are websites or computer applications which allow individuals, groups, or businesses to interact and communicate with one another over the Internet. Whereas email is generally a directed communication from a sender to one or more recipients, social networks allow for passive communications, where the sender can post content which can be viewed by any individual visiting that page or account. Popular social networks include Facebook®, Instagram® (owned by Facebook), WhatsApp® (also owned by Facebook), LinkedIn®, Twitter®, and SnapChat®.

With few exceptions, social networks are free to the users, with the social network companies generally earning money through advertisements. The social networks often target these advertisements to the individual based on data collected about the individual. This data can include information such as (1) the social web of the individual (that is, who are "friends," "followers," or otherwise associated with the individual); (2) reactions to content (such as "likes" or recommendations of the individual, as well as content watched, read, or otherwise interacted with); and (3) demographics of the individual. While this business model can allow the companies to target specific individuals (such as a male, in his 30s, who generally responds well to military related content), the privacy of the users is compromised. More specifically, the user's information is shared with entities over which the individual has no control.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include receiving, at a processor on a computing device, a social media profile associated with a user, the social media profile comprising a name of the user and at least one datum of the user; anonymizing, via the processor, the social media profile using asymmetrical encryption, resulting in an anonymous social media profile comprising an encrypted user identification and at least one encrypted interest, the asymmetrical encryption using a private key and a public key; providing, via a display of the computing device, social media content retrieved from a social media platform, wherein the social media content is retrieved using the anonymous social media profile in an encrypted state; and as the user engages with the social media content: presenting, via a display of the computing device, an option to the user to engage with an individual entity within the social media content in an unencrypted state; receiving, from the user, an indication to share a specific portion of the social media profile with the individual entity; requesting, in response to the indication to share the specific portion of the social media profile, the private key; receiving, from the user, the private key; decrypting, via the processor and using the private key, a specific portion of the anonymous social media profile corresponding to the specific portion of the social media profile identified by the indication, resulting in a partially decrypted anonymous social media profile; and sharing the partially decrypted anonymous social media profile with the individual entity.

A system configured to perform the concepts disclosed herein can include: a processor; and a non-transitory computer-readable storage medium having instructions stored which, when executed by the processor, cause the processor to perform operations comprising: receiving a social media profile associated with a user, the social media profile comprising a name of the user and at least one datum of the user; anonymizing the social media profile using asymmetrical encryption, resulting in an anonymous social media profile comprising an encrypted user identification and at least one encrypted interest, the asymmetrical encryption using a private key and a public key; providing, via a display of the computing device, social media content retrieved from a social media platform, wherein the social media content is retrieved using the anonymous social media profile in an encrypted state; and as the user engages with the social media content: presenting, via a display of the computing device, an option to the user to engage with an individual entity within the social media content in an unencrypted state; receiving, from the user, an indication to share a specific portion of the social media profile with the individual entity; requesting, in response to the indication to share the specific portion of the social media profile, the private key; receiving, from the user, the private key; decrypting, using the private key, a specific portion of the anonymous social media profile corresponding to the specific portion of the social media profile identified by the indication, resulting in a partially decrypted anonymous social media profile; and sharing the partially decrypted anonymous social media profile with the individual entity.

A non-transitory computer-readable storage medium configured as disclosed herein can have instructions stored which, when executed by a computing device, cause the computing device to perform operations which include: receiving a social media profile associated with a user, the social media profile comprising a name of the user and at least one datum of the user; anonymizing the social media profile using asymmetrical encryption, resulting in an anonymous social media profile comprising an encrypted user identification and at least one encrypted interest, the asymmetrical encryption using a private key and a public key; providing, via a display of the computing device, social media content retrieved from a social media platform, wherein the social media content is retrieved using the anonymous social media profile in an encrypted state; and as the user engages with the social media content: presenting, via the display of the computing device, an option to the user to engage with an individual entity within the social media content in an unencrypted state; receiving, from the user, an indication to share a specific portion of the social media profile with the individual entity; requesting, in response to the indication to share the specific portion of the social media profile, the private key; receiving, from the user, the private key; decrypting, using the private key, a specific portion of the anonymous social media profile corresponding to the specific portion of the social media profile identified by the indication, resulting in a partially decrypted anonymous social media profile; and sharing the partially decrypted anonymous social media profile with the individual entity.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a social media network platform which allows the user to control every aspect of their data, including which brands, agencies, individuals, entities, organizations, groups, and/or friends have access to user information. This access to information can also limit what advertisements, invitations, etc., the user is exposed to. The increase in privacy occurs by using asymmetrical encryption on all aspects of a user's profile, such as their name, interests, social media interactions, etc., resulting in an anonymized profile. As the user interacts with social media content, advertisers and content publishers may (in some configurations) be able to determine that an interaction has occurred. However, the advertisers and content publishers are only provided encrypted/anonymous identifier information about the user. If a user determines that they wish to share their non-encrypted information with a specific advertiser, content publisher, or other user, the user can decrypt a specific portion of their anonymous user profile using a private key and share that decrypted, specific portion. When posting or otherwise sharing data on the social media platform, the user can have the data default to encrypted, then manually select that the data be decrypted. Alternatively, the user can have the data default to encrypted for unknown brands, advertisers, or other users, but default to unencrypted for friends, known entities, pre-selected brands, etc.

For example, if a user posts an image on the social media platform, the user can select if the image is available to a specific friend or friends, to the public, or to other entities. However, whereas other social media platforms may allow that image to be used in analyses (without the user's permission), images shared using this platform would not be used for such analyses without express permission from the user. As another example, if a video on the social media platform is watched by the user, an article read by the user, a linked clicked on by the user, or other types of engagement take place, other social media platforms collect data associated with that interaction and make inferences about the user from that data collection. By contrast, the user of the social media platform disclosed herein can anonymously view and interact with contact using an anonymous social media profile, the anonymous social media profile created using asymmetrical encryption on the user's social media profile In other words, the social media platform disclosed herein is a user-controlled network, where the user invites friends, publishers, interest groups, and brands to join their personal digital footprint, and the user can control the level and terms of communication between the user and these various entities. No personal information can be tracked, mined, or sold without the user's permission using the disclosed social media platform.

Like other modern social media platforms, the social media platform disclosed herein can be used on mobile or non-mobile computing devices, such as smartphones, tablets, personal computers, etc. While in some configurations the platform can reside within an ISP (Internet Service Provider) network (that is, can be server based), in other configurations the platform can reside outside of a network (that is, the software to operate the platform can be based on the devices of the users, rather than on servers or other central computing devices).

Because interactions are controlled by the user, the user can decide when to exchange their most effective and valuable information, rather than the social media platform, the advertisers, or other entities determining when to obtain and use the user's information. Because the user affirmatively allows their information to be made available to the respective entity, the entities must thereby build trust and confidence with the users in order to generate traffic, repeat sales, and on-going sales leads. The platform can also allow the users to aggregate, bundle, or otherwise combine their information and customize how that aggregated data is stored, shared, viewed, and used in transactions.

The data stored within the platform can also be used by the user to interact with Internet of Things (IoT) devices. For example, if the user has established a relationship with a clothing detergent company using the platform, and the user has also provided permission for an IoT enabled washing machine to interact with the user's data via the platform, the washing machine the clothing detergent company, and the platform can work together to provide customized advertisements, promotions, suggestions (e.g., based on your frequency of washing you should purchase this type of detergent; based on your activities (known from the social media platform) a particular detergent is recommended).

The social media platform can segment the user's data (such as photographs, videos, calendar information, documents, banking information, GPS data, etc.) and the ability to share that data associated with various entities (such as brands, groups, friends, etc.) In order for any of the user's data to be shared the user will need to affirmatively confirm the sharing of that data with the other entity, where the affirmation can be confirmed by the user applying their private key to the particular data being shared. This can be limited to specific pieces of data (i.e., share this picture) or providing indefinite access to specific data (i.e., share pictures with this person going forward). As an example of this with a brand, the user can share a current GPS location with a brand (that is, giving a single current location to the brand) or can allow GPS data to be shared with that brand indefinitely.

Brands, when given permission to interact with the user, can provide the user with customized offers, where the customized offer is based on the amount of data/permission granted by the user. At a basic level, the user may grant the brand permission to send the user "blind" advertisements (that is, not customized to the individual user). At a higher level, the user may grant some personal information to the brand which may be mined and used to personalize advertisements. Depending on the amount and type of data being shared, this allows marketers to tailor marketing to individual user preferences in real-time.

To ensure privacy of data, even when users have granted permission for brands and other commercial entities, the system can anonymize the user's information, such that the brands never have access to the individual's actual name or identity. Instead, each individual can be assigned a number or other identification which is used to identify the user and the user's content. In some configurations, the number or identification used to identify the user can be changed periodically, such that no long-term, longitudinal information or behavior patterns of the user can be developed by the brands.

In some cases, where asymmetrical encryption on the user's data and/or profile occurs, the platform can serve as a key agent, allowing users to control end-to-end encryption of their data through the use of public and private keys associated with the respective entities. For example, a brand might provide a notification which is encrypted and requires a public key in order for the platform to decrypt and forward the notification to individuals. To identify the correct individuals to receive the notification, the platform may require additional public keys associated with the individuals. To decrypt notifications sent to them, the individuals may require private keys. Likewise, in order for the social media platform to render certain aspects of a user's profile public can require the user providing their private key, which would then be confirmed using the corresponding public key.

To manage what permissions have been given to specific entities, the social media platform can contain an opt-in registry, which contains a list of individuals who have granted permission for a specific brand, type of advertisement, or other content. Associated with the opt-in registry can be a target engine, which can identify content which is most likely to be accepted by an individual. In some configurations, the target engine can place an advertisement on the user's graphical user interface (on their smartphone, computer, or other device), where the advertisement is based on the platform's assessment of the user, but where no user data has been shared with the various brands or entities. Such targeting would be based entirely on data which the user has explicitly agreed would be collected and/or analyzed.

In some configurations, the social media platform disclosed herein can use digital television, pay television, streamed content, and commercial advertising viewership data as data commodities for marketers and brands. In addition, the social media platform can enable users to control and approve the release and distribution of different levels of user viewership data for all digital video, digital television, and commercial advertising viewership data. This includes viewership monitoring, measurement, and data exchanges with brands, agencies, and service providers for online, cable, satellite, wireless content viewed via any digital set-top box, digital device, or digital video platform.

User controlled television and streaming data can include (but is not limited to): latitude/longitude (or GPS location) of device; channel number; network; program/show information (name, duration, content type, etc.); publisher site data; video stream data; commercials associated with the show; start and stop times of the show (including commercials); viewing medium (i.e., streaming v. broadcasting); did viewer watch complete show, stream, or commercial?; length of time viewing channel, show, stream, or commercial; did the viewer change channels? If so, what channel did the viewer change to?; and voice command data. Likewise, such information can be associated with devices which are part of automobiles, such as display screens built into automobile consoles, displays for back seat passengers, etc., and their viewership information.

Figure 1:
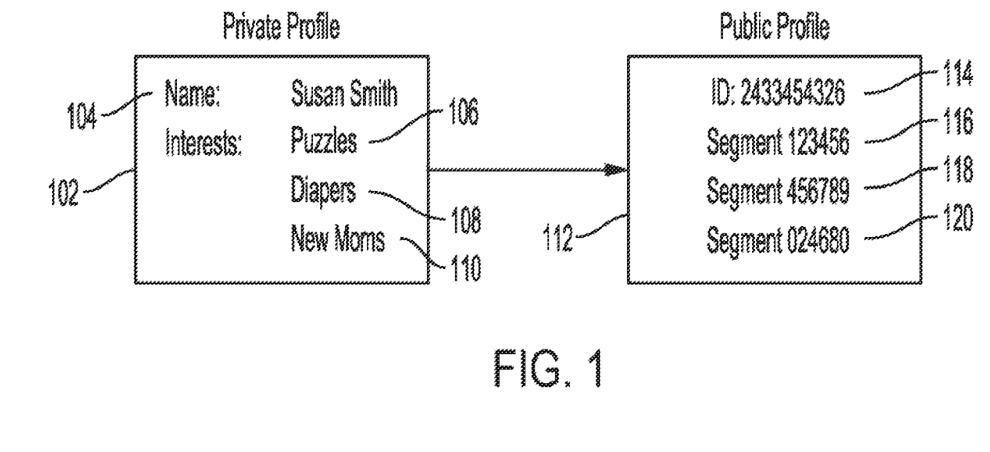
FIG. 1 illustrates an example of a user profile being anonymized.

FIG. 1 illustrates an example of a user profile being anonymized. As illustrated, a user has a private profile 102. In this example, the private profile 102 contains the user's name 104, as well as interests 106, 108, 110 of the user. In other examples, the private profile 102 can contain additional and/or different information about the user, such as a current location (GPS), hometown, education, demographics, job title, phone number, pictures, posts, and/or interaction data detailing how the user has interacted with various content on the social media platform.

In this example, the user's private profile 102 is encrypted, resulting in an encrypted, anonymized user profile 112. The user's name 104 from the non-encrypted profile 102 is represented by a user identification number 114. Likewise, the user's interests 106, 108, 110 are represented by anonymized numbers 116, 118, 120 within the anonymized user profile 112. While in this example, both the user identification 114 and the anonymized user interests 116, 118, 120 are represented by digits, in other configurations the encrypted, anonymized results can be alphanumeric.

Figure 2:
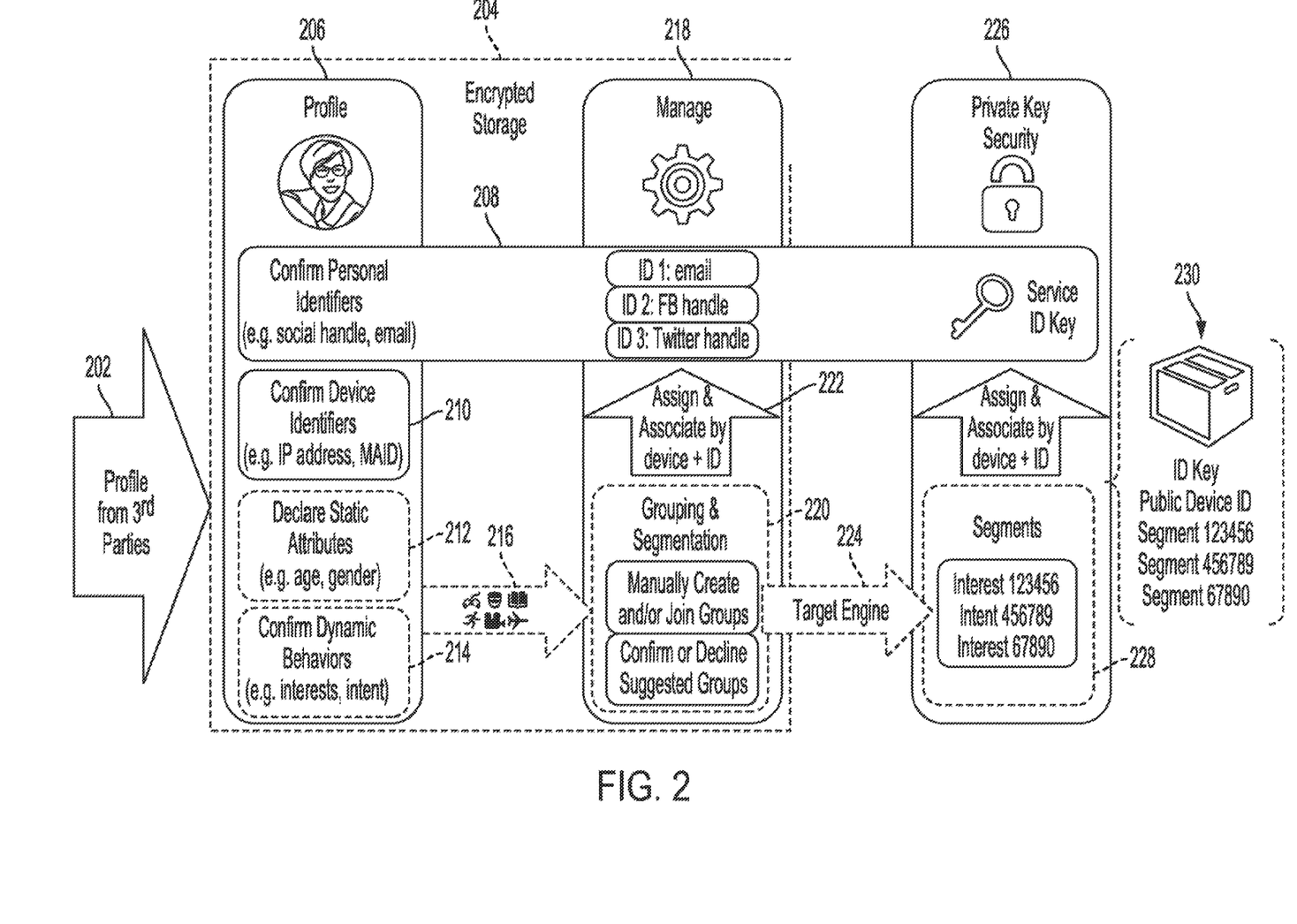
FIG. 2 illustrates an example of management of an anonymized user profile being shared.

FIG. 2 illustrates an example of management of an anonymized user profile being shared. In this example, a server 204 or other computing device receives a user profile 202 from a third party, and stores the user profile 206 within the server memory. The user can confirm, with the server 204, the profile 206 received 202 and stored in the server's 204 memory. More specifically, the user can confirm aspects such as the user's personal identifiers 208 (social handles, email accounts, TWITTER handle, etc.) using an identification key. The user can also confirm device identifiers (e.g., the IP address for the computer they are using, or MAID (Massive Array of Idle Disks) address) 210, declare (relatively) static attributes (demographics) about the user, such as age and gender 212, and/or confirm dynamic behaviors, such as interests and intent 214.

The system groups 216 the user's static attributes 212 and dynamic behaviors 214, and the resulting group 220 can be managed 218 within the encrypted storage of the server 204, with aspects of the group 220 being assigned, organized, and associated 222 based on the device and/or by the device identification. For example, the user can manually create and/or join groups, confirm or decline suggested groups, etc. The user's identification and data together form a user profile 230 which is encrypted/anonymized and sent 224 to a target engine. When the user profile 230 is managed by the target engine, the user can manage privacy/security 230 over the user profile, with the user being able to select which segments 228 (interests, shared data, individual data points) they wish to share, and the system decrypting those selected segments with the user's private key.

Figure 3A:
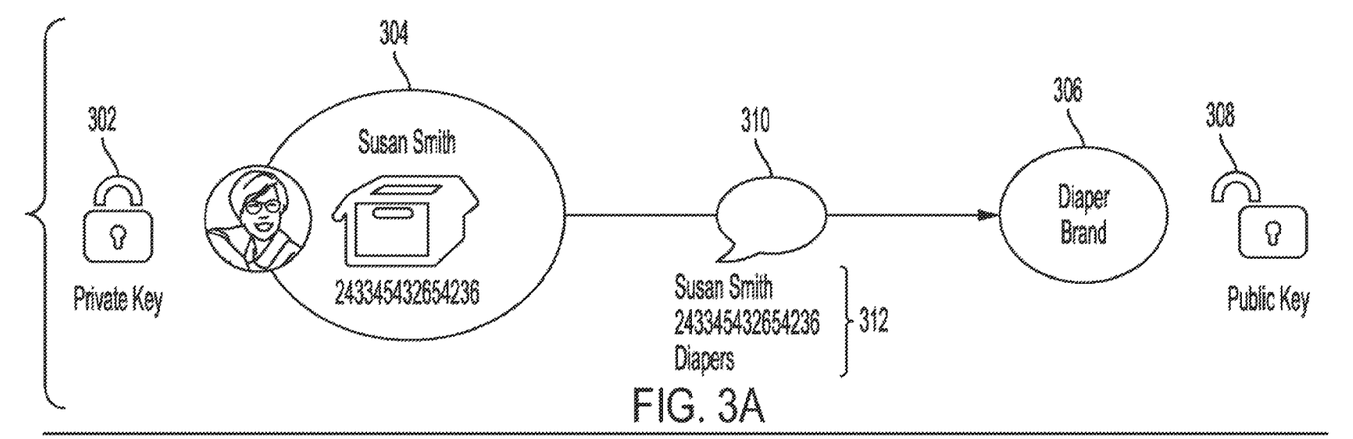
FIG. 3A illustrates an example of a user engaging with a brand sharing only a portion of their user profile.

In some circumstances, the user of the social media platform may wish to interact with an entity without sharing all aspects of their profile. FIG. 3A illustrates an example of a user engaging with a brand sharing only a portion of their user profile. In this example, the user 304 Susan Smith wishes to interact 310 with a particular diaper brand 306 via a one way communication using the social media platform, and wishes that specific aspects of her user profile with the diaper brand 306. Susan uses her private key 302 when sending the one way communication 310, specifically allowing the diaper brand 310 access to her name, identification, and Susan's interest in diapers 312. The diaper brand 310 uses a public key 308 associated with Susan to decrypt the message 310, and only has access to those aspects 312 of Susan's profile which Susan has given permission to access.

Figure 3B:
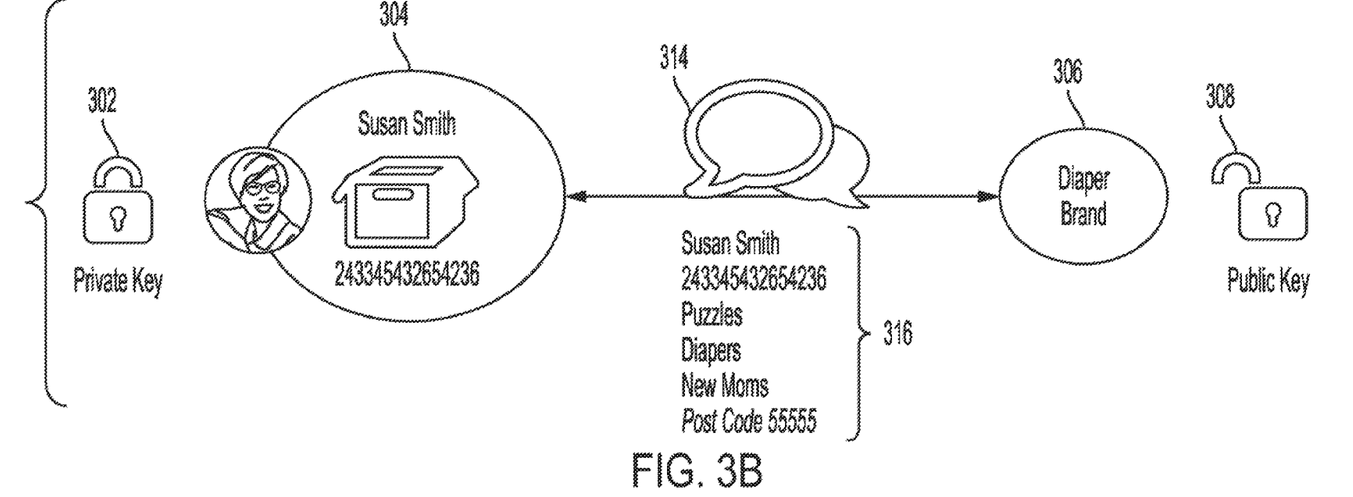
FIG. 3B illustrates an example of a user engaging with the brand while sharing all aspects of their user profile.

FIG. 3B illustrates an example of a user engaging with the brand while sharing all aspects of their user profile. In this example, Susan 304 uses her private key 302 to engage in a two way conversation 314 with the brand 306, sharing all aspects 316 of her profile. The communications 314 from Susan can also use the private key 302, and the diaper brand 306 can again use the public key 308 to open the private key 302 encrypted communication 314. Likewise, Susan can use the private key 308 to read messages 314 from the diaper brand 306, where the diaper brand uses the public key 308 in sending the message 314.

Figure 4:
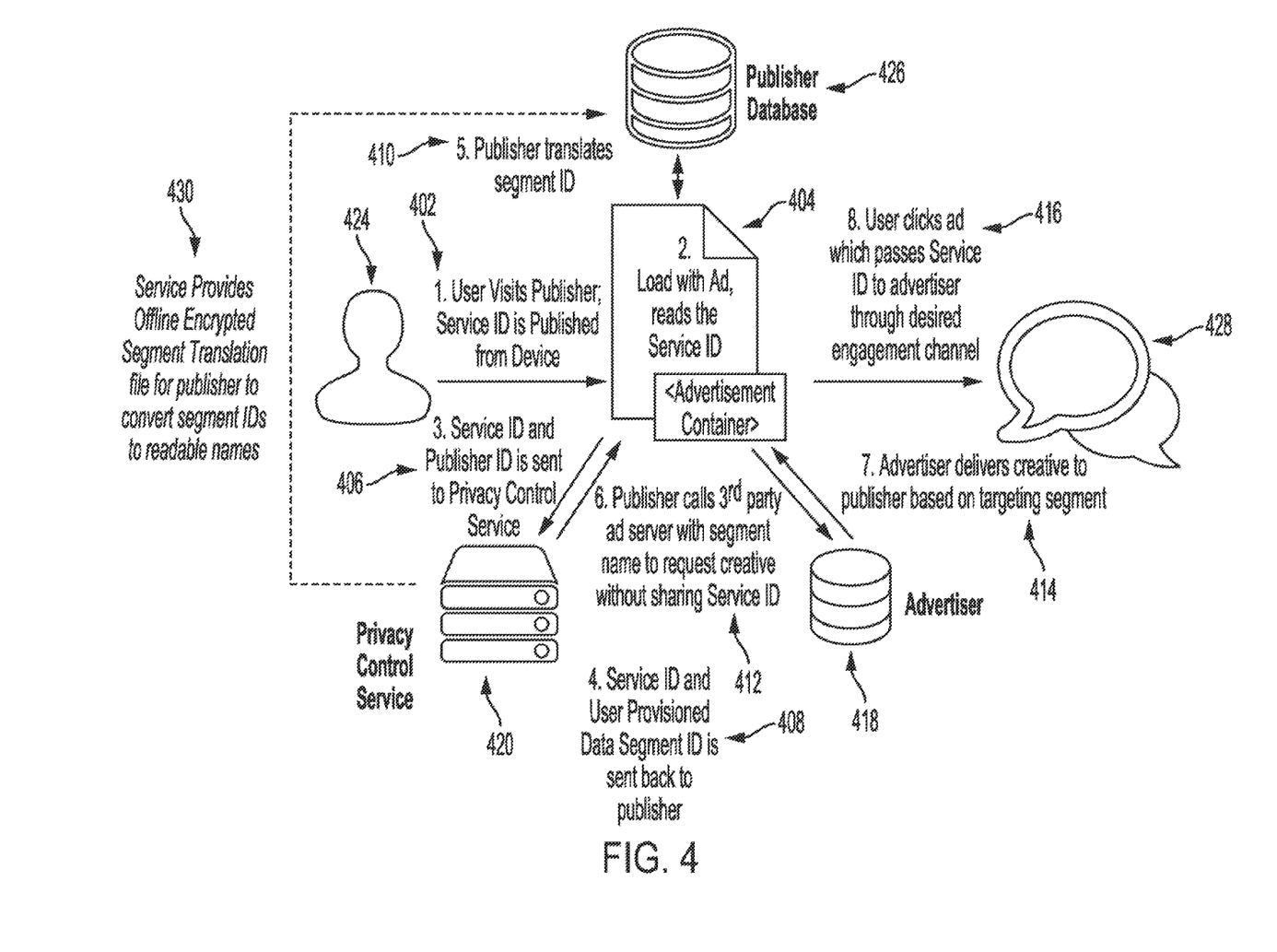
FIG. 4 illustrates an example of communications to deliver a creative to a user.

FIG. 4 illustrates an example of communications to deliver a creative to a user. A creative can be any material developed and/or generated by an artist, advertiser, marketing agency, etc., such as banner advertisements, video advertisements, marketing material, and/or other content being shared with a user. First, (1) the user 424 using the social media platform described herein visits a publisher using a device, and a service identification is published from the device 402. The publisher 404 reads the service identification and prepares/loads an advertisement into an advertisement container, the advertisement container being a preparation location as the publisher 404 coordinates with privacy and other concerns. The publisher 404 also generates a publisher identification, then (3) transmits the service identification and the publisher identification 406 to a privacy control service 420. In some configurations, the privacy control service 420 can be built into the user's 424 device, in other configurations the privacy control service 420 can be integrated into the social media platform, while in yet other configurations the privacy control service can be a third party service. (4) The privacy control service 420 transmits 408 the service identification and user provisioned data segment identifications back to the publisher 404. The user provisioned data segment identifications can, in this example, identify specific portions of the user's profile which the user has granted permission to share with the publisher 404 and/or the advertiser 418. The privacy control service 420 also provides offline encrypted segment translation files for the publisher 404 to convert segment identifications to readable names 430.

(5) The publisher translates the segment identification 410, looking up in the publisher database 426 the readable names corresponding to the particular segments the user has given permission to identify/access. For example, if the user has given permission for the publisher to know about their interest in "diapers," the segment identification for the segment associated with the diapers interest can be given to the publisher, and the publisher can translate that segment into a readable name—in this case, diapers. (6) The publisher calls a third party advertisement server 418 with the readable segment name to request a creative, without sharing the segment identification that led to that request 412. This keeps the user's encrypted segment identification secure, while still allowing the access which has been granted.

(7) The advertiser 418 delivers the creative to the publisher 404 based on the targeting segment 414, then the publisher 404 delivers the creative (in this case an advertisement) to the user's device. As the creative is shared with the user, the user can engage with it. In this case, (8) the user clicks the advertisement (the creative), which passes the service identification to the advertiser through the desired engagement channel 416, allowing the user 424 to engage directly 428 with the advertiser 418.

Figure 5:
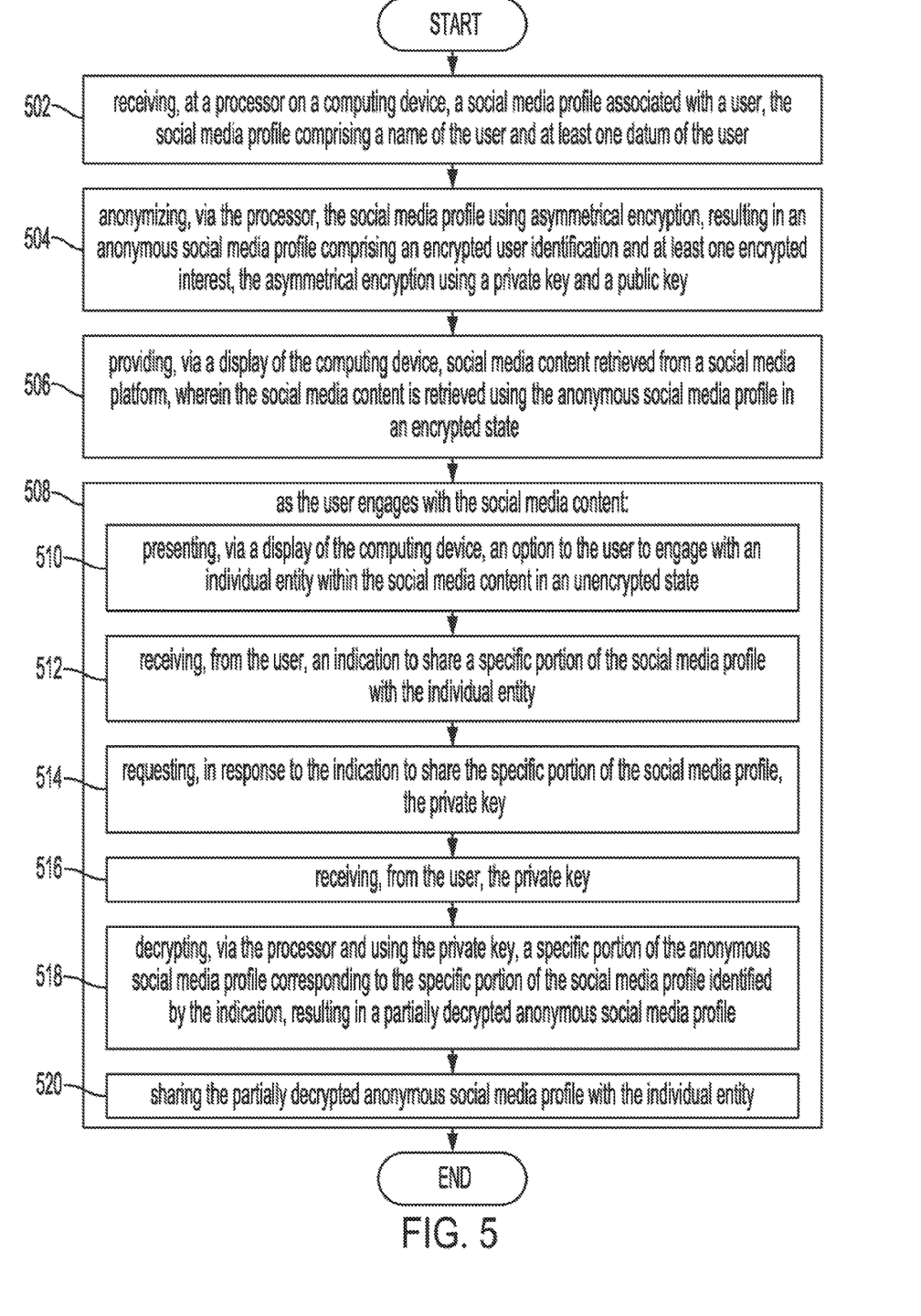
FIG. 5 illustrates an example method embodiment.

FIG. 5 illustrates an example method embodiment. In this example, the method includes receiving, at a processor on a computing device (or system), a social media profile associated with a user, the social media profile comprising a name of the user and at least one datum of the user (502), and anonymizing, via the processor, the social media profile using asymmetrical encryption, resulting in an anonymous social media profile comprising an encrypted user identification and at least one encrypted interest, the asymmetrical encryption using a private key and a public key (504). In some circumstances, the receiving of the social media profile can occur as the user is creating their user profile or signing up for a social media platform, whereas in other instances the social media profile can already exist and be shared with a new system or social media platform. The method continues by providing, via a display of the computing device, social media content retrieved from a social media platform, wherein the social media content is retrieved using the anonymous social media profile in an encrypted state (506).

As the user engages with the social media content (508), the method continues by: presenting, via a display of the computing device, an option to the user to engage with an individual entity within the social media content in an unencrypted state (510). The individual entity can be, for example, another user, a brand, an advertiser, or other poster of content on the social media platform. As the user continues to engage with the social media content, the system receives, from the user, an indication to share a specific portion of the social media profile with the individual entity (512), and requests, in response to the indication to share the specific portion of the social media profile, the private key (514). The system receives, from the user, the private key (516) and decrypts, via the processor and using the private key, a specific portion of the anonymous social media profile corresponding to the specific portion of the social media profile identified by the indication, resulting in a partially decrypted anonymous social media profile (518). Finally, the system shares the partially decrypted anonymous social media profile with the individual entity (520).

In some configurations, the at least one datum of the social media profile can include demographic data of the user, such as the user's age, gender, education level, socio-economic status, location, etc. Likewise, the individual entity can be a commercial entity advertising on the social media platform, such that the method further includes: receiving, from the individual entity, a creative based on the demographic data decrypted using the private key. The creative can be, for example a coupon, advertisement, deal, or other communication being shared with the user.

In some configurations, the method can further include displaying, as part of the social media content, an advertisement which is not based on either (1) the social media profile, or (2) cookies stored on the computing device. In such cases, the system can be configured such that the option only appears upon the user interacting with the advertisement. For example, the option may be presented to the user after the user has clicked on an advertisement or otherwise indicated a desire to interact with the brand sponsoring the advertisement.

In some configurations, the individual entity is a second user, the second user being represented within the social media platform by a second anonymous social media profile, and the option can be contingent on the second user decrypting a specific portion of the second anonymous social media profile which corresponds to the specific portion of the social media profile of the user.

Figure 6:
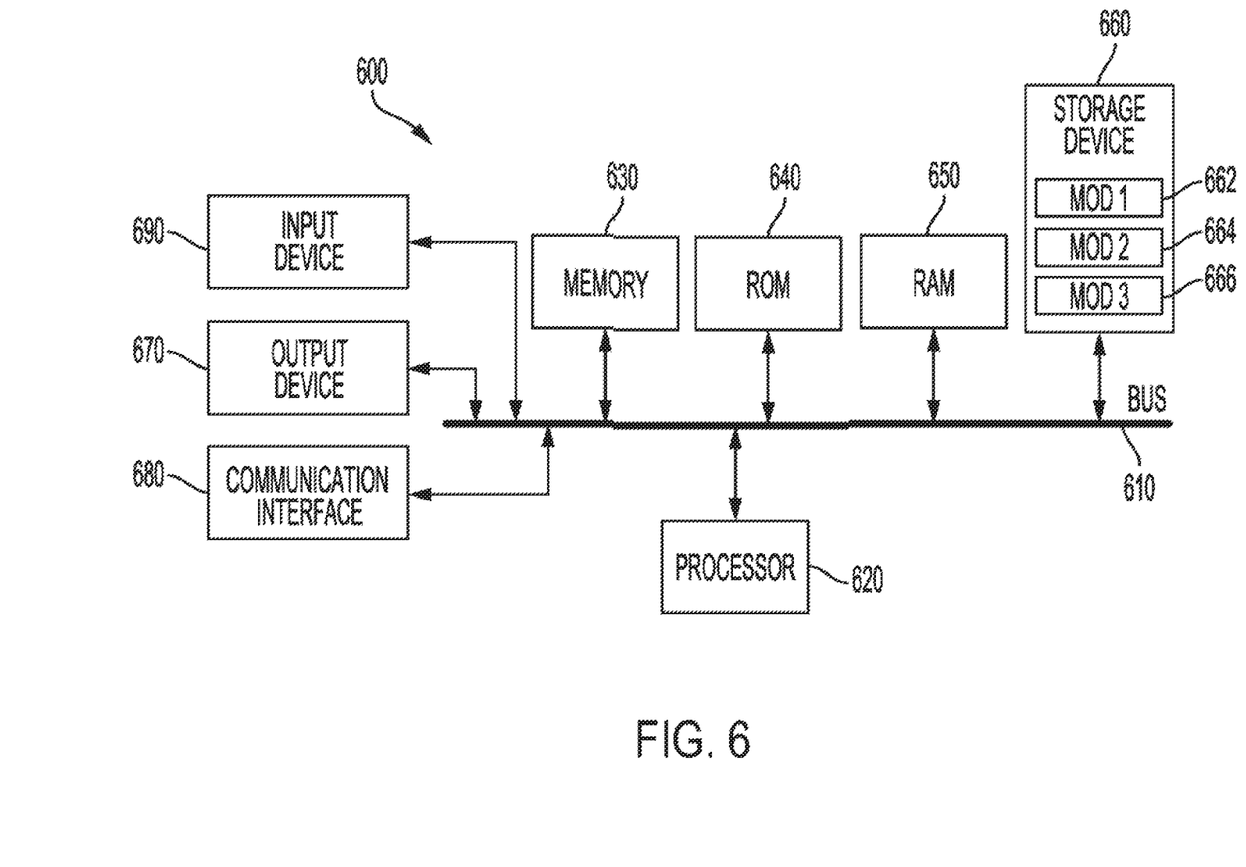
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The steps outlined herein are exemplary and can be implemented in any combination thereof, including combinations that exclude, add, or modify certain steps.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method comprising:
    receiving, at a processor on a computing device, a social media profile associated with a user, the social media profile comprising a name of the user and at least one datum of the user;
    anonymizing, via the processor, the social media profile using asymmetrical encryption, resulting in an anonymous social media profile comprising an encrypted user identification and at least one encrypted interest, the asymmetrical encryption using a private key and a public key;

providing, via a display of the computing device, social media content retrieved from a social media platform, wherein the social media content is retrieved using the anonymous social media profile in an encrypted state; and as the user engages with the social media content:

presenting, via a display of the computing device, an option to the user to engage with an individual entity within the social media content in an unencrypted state;

receiving, from the user, an indication to share a specific portion of the social media profile with the individual entity;

requesting, in response to the indication to share the specific portion of the social media profile, the private key;

receiving, from the user, the private key;

decrypting, via the processor and using the private key, a specific portion of the anonymous social media profile corresponding to the specific portion of the social media profile identified by the indication, resulting in a partially decrypted anonymous social media profile; and sharing the partially decrypted anonymous social media profile with the individual entity.

2. The method of claim 1, wherein the at least one datum of the social media profile comprises demographic data of the user.

3. The method of claim 2, wherein the individual entity comprises a commercial entity advertising on the social media platform, and the method further comprises:

receiving, from the individual entity, a creative based on the demographic data decrypted using the private key.

4. The method of claim 3, wherein the creative comprises a coupon.

5. The method of claim 1, further comprising:

displaying, as part of the social media content, an advertisement which is not based on either (1) the social media profile, or (2) cookies stored on the computing device.

6. The method of claim 5, wherein the option appears upon the user interacting with the advertisement.

7. The method of claim 1, wherein the individual entity comprises a second user, the second user being represented within the social media platform by a second anonymous social media profile, and wherein the option is contingent on the second user decrypting a specific portion of the second anonymous social media profile which corresponds to the specific portion of the social media profile of the user.

8. A system comprising:

a processor; and a non-transitory computer-readable storage medium having instructions stored which, when executed by the processor, cause the processor to perform operations comprising:

receiving a social media profile associated with a user, the social media profile comprising a name of the user and at least one datum of the user;

anonymizing the social media profile using asymmetrical encryption, resulting in an anonymous social media profile comprising an encrypted user identification and at least one encrypted interest, the asymmetrical encryption using a private key and a public key;

providing, via a display of the computing device, social media content retrieved from a social media platform, wherein the social media content is retrieved using the anonymous social media profile in an encrypted state; and as the user engages with the social media content:

presenting, via a display of the computing device, an option to the user to engage with an individual entity within the social media content in an unencrypted state;

receiving, from the user, an indication to share a specific portion of the social media profile with the individual entity;

requesting, in response to the indication to share the specific portion of the social media profile, the private key;

receiving, from the user, the private key;

decrypting, using the private key, a specific portion of the anonymous social media profile corresponding to the specific portion of the social media profile identified by the indication, resulting in a partially decrypted anonymous social media profile; and sharing the partially decrypted anonymous social media profile with the individual entity.

9. The system of claim 8, wherein the at least one datum of the social media profile comprises demographic data of the user.

10. The system of claim 9, wherein the individual entity comprises a commercial entity advertising on the social media platform, and the non-transitory computer-readable storage medium has additional instructions stored which, when executed by the processor, cause the processor to perform operations comprising:

receiving, from the individual entity, a creative based on the demographic data decrypted using the private key.

11. The system of claim 10, wherein the creative comprises a coupon.

12. The system of claim 8, the non-transitory computer-readable storage medium having additional instructions stored which, when executed by the processor, cause the processor to perform operations comprising:

displaying, as part of the social media content, an advertisement which is not based on either (1) the social media profile, or (2) cookies stored on the computing device.

13. The system of claim 12, wherein the option appears upon the user interacting with the advertisement.

14. The system of claim 8, wherein the individual entity comprises a second user, the second user being represented within the social media platform by a second anonymous social media profile, and wherein the option is contingent on the second user decrypting a specific portion of the second anonymous social media profile which corresponds to the specific portion of the social media profile of the user.

15. A non-transitory computer-readable storage device having instructions stored which, when executed by a computing device, cause the computing device to perform operations comprising:

receiving a social media profile associated with a user, the social media profile comprising a name of the user and at least one datum of the user;

anonymizing the social media profile using asymmetrical encryption, resulting in an anonymous social media profile comprising an encrypted user identification and at least one encrypted interest, the asymmetrical encryption using a private key and a public key;

providing, via a display of the computing device, social media content retrieved from a social media platform, wherein the social media content is retrieved using the anonymous social media profile in an encrypted state; and as the user engages with the social media content:
- presenting, via the display of the computing device, an option to the user to engage with an individual entity within the social media content in an unencrypted state;
- receiving, from the user, an indication to share a specific portion of the social media profile with the individual entity;
- requesting, in response to the indication to share the specific portion of the social media profile, the private key;
- receiving, from the user, the private key;
- decrypting, using the private key, a specific portion of the anonymous social media profile corresponding to the specific portion of the social media profile identified by the indication, resulting in a partially decrypted anonymous social media profile; and
- sharing the partially decrypted anonymous social media profile with the individual entity.

16. The non-transitory computer-readable storage device of claim 15, wherein the at least one datum of the social media profile comprises demographic data of the user.

17. The non-transitory computer-readable storage device of claim 16, wherein the individual entity comprises a commercial entity advertising on the social media platform, and the non-transitory computer-readable storage device has additional instructions stored which, when executed by the computing device, cause the computing device to perform operations comprising:
- receiving, from the individual entity, a creative based on the demographic data decrypted using the private key.

18. The non-transitory computer-readable storage device of claim 17, wherein the creative comprises a coupon.

19. The non-transitory computer-readable storage device of claim 15, having additional instructions stored which, when executed by the computing device, cause the computing device to perform operations comprising:
- displaying, as part of the social media content, an advertisement which is not based on either (1) the social media profile, or (2) cookies stored on the computing device.

20. The non-transitory computer-readable storage device of claim 19, wherein the option appears upon the user interacting with the advertisement.

* * * * *